Dec. 6, 1932.   C. J. HANSEN   1,889,894
RECOVERING HYDROGEN SULPHIDE FROM GAS MIXTURES
Filed Aug. 2, 1929
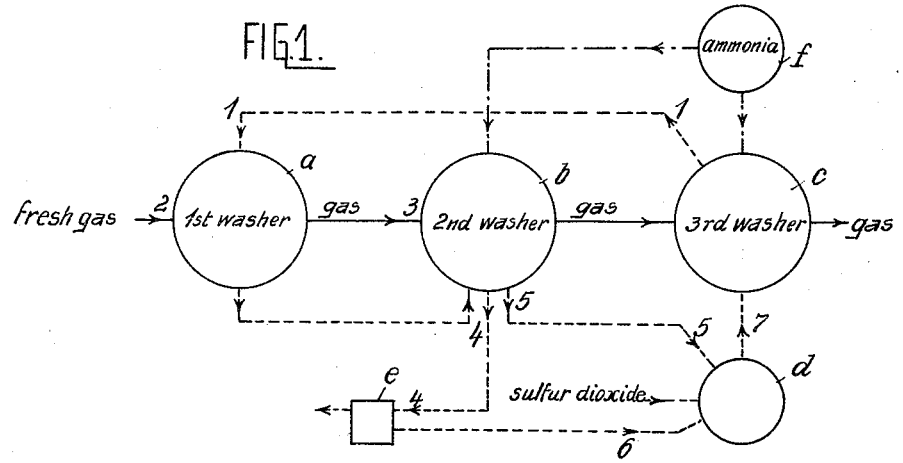
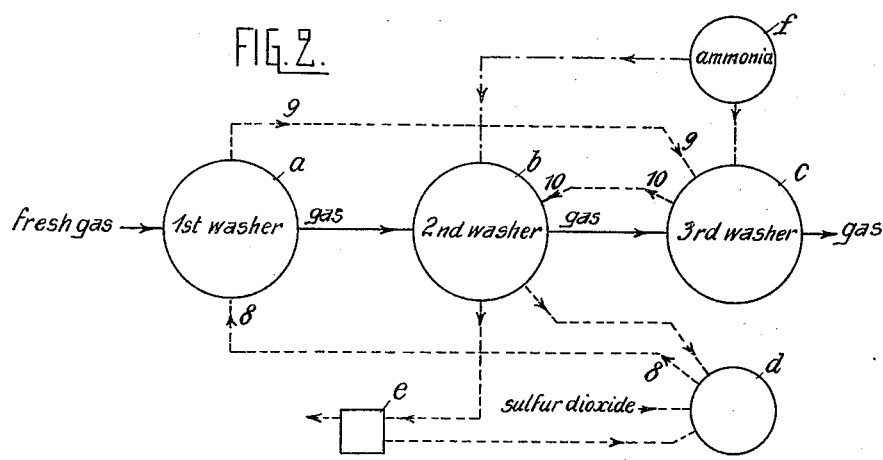
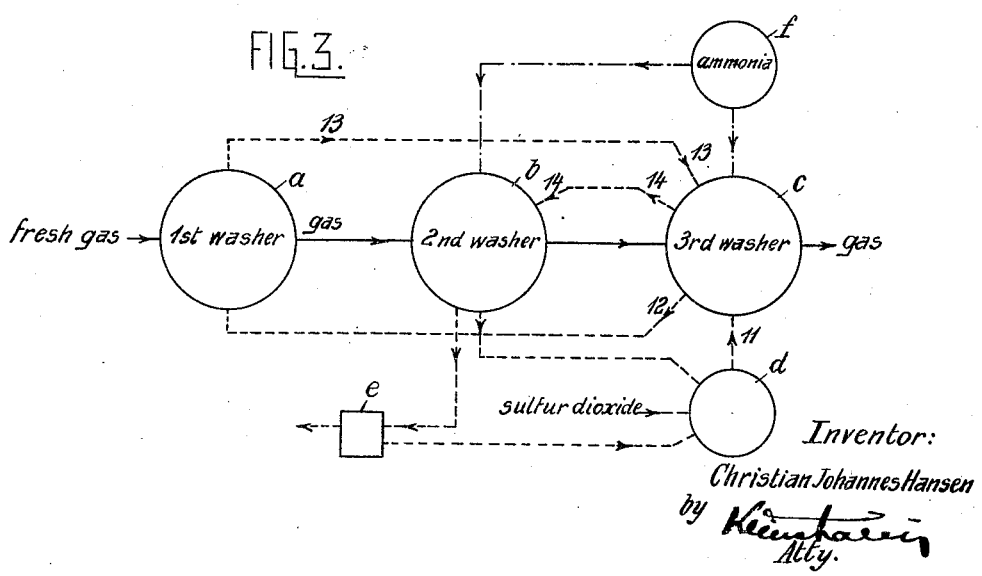
Inventor:
Christian Johannes Hansen Patented Dec. 6, 1932

1,889,894

UNITED STATES PATENT OFFICE

CHRISTIAN JOHANNES HANSEN, OF ESSEN-RUHR, GERMANY, ASSIGNOR, BY MESNE ASSIGNMENTS, TO THE KOPPERS COMPANY OF DELAWARE, OF PITTSBURGH, PENNSYLVANIA, A CORPORATION OF DELAWARE

RECOVERING HYDROGEN SULPHIDE FROM GAS MIXTURES

Application filed August 2, 1929, Serial No. 383,113, and in Germany January 10, 1929.

My invention refers to the treatment of gas mixtures containing hydrogen sulphide and ammonia, such as for instance coke oven gases, with a view to recovering therefrom hydrogen sulphide and ammonia, for instance under the form of other compounds such as ammonium sulphate and sulphur.

As is well known to those skilled in the art, hydrogen sulphide and ammonia have already been recovered from coke oven gas and similar gas mixtures by means of solutions of metal thionates (i. e. thiosulphates and/or polythionates), more especially the thionates of iron, manganese or zinc which metals form sulphides insoluble in water, but soluble as thionates in the presence of sulphur dioxide. In this process that part of the liquor which is subjected to further treatment for the recovery of ammonium sulphate and sulphur must be freed from the metals dissolved therein in order to avoid a metal content of the ammonium sulphate ultimately obtained. Hitherto this has been effected by treating the liquor directly with fresh gas mixture, the ammonia and hydrogen sulphide in the mixture acting on the metal compounds in the liquor to convert them into sulphides, which have been separated from the salt solution by filtration, centrifuging or settling.

However, in those cases, where a direct or semi-direct treatment was used, i. e. a treatment by which the gas mixture is first deprived by cooling of part of the ammonia, the difficulty was encountered that the washing liquor, when acted upon with fresh gas for the purpose of precipitating the dissolved metals, took up more ammonia than was required for the conversion of the metal compounds into sulphides according to the excellent solubility of ammonia in water and to the rather poor solubility of hydrogen sulphide. When all the metals are converted to sulphides, the liquor, even if it already contains some free ammonia, will continue to dissolve further quantities of ammonia, which is thus withdrawn together with the liquor for the separation of the sulphides and the recovery of ammonium sulphate and of sulphur, or for the regeneration of the washing liquor by treating it with sulphur dioxide. This withdrawal of part of the ammonia exerts a detrimental effect on the efficiency of the process. For the treatment with metal thionate solutions will result in the removal of hydrogen sulphide from the gas mixture only if a sufficient quantity of ammonia is present.

It is true that the quantity of ammonia in excess of that required for the conversion of the metals into sulphides is not lost altogether, being also converted into ammonium sulphate, however, the practice of the process has shown that the efficient washing of the gas is rendered difficult, if not impossible, by this local deficiency in ammonia.

I avoid this drawback according to this invention by providing for the liquor, from which the metal compounds shall be removed as sulphides, only that quantity of ammonia, which is required for this reaction, i. e. the quantity substantially equivalent to the dissolved metal salts which are to be precipitated as sulphides. And I thereafter treat it in a separate operation in a similar way in the presence of a further quantity of ammonia for the removal of the residual hydrogen sulphide. As a rule the ammonia required in this process may be recovered from the gas mixture itself by cooling, as is usual in this art.

In practising my invention I prefer conducting the washing liquor in a particular manner, which is illustrated by way of example in the diagrams annexed to this specification and forming part thereof.

In these diagrams $a$, $b$, and $c$ are three washers connected in series. According to this invention the washing liquor is not conducted through the washers in counter-current to the gas mixture, but it is for instance introduced at first into the last or final washer $c$ and from here, as shown by the arrows 1 (Fig. 1), into the first or initial washer $a$, which is supplied with fresh gas as shown by the arrow 2. After having been brought in contact with the fresh gas, the washing liquor is now conducted into the medium washer $b$, as shown by the arrow 3. From the washer $b$ part of the liquor is conducted into the settling tank $e$, as shown by the arrows 4, to be freed from the metal sulphides, while another part is conducted as shown by the arrows 5 into the vessel $d$, where the spent liquor is regenerated by treatment with sulphur dioxide. The sulphide sludge, which has settled down in the tank $e$, is also introduced into the vessel $d$, as shown by the arrow 6, and is reconverted therein by the action of sulphur dioxide into dissolved thionates. All the liquor treated with sulphur dioxide in $d$ is then returned to the washer $c$, as shown by the arrow 7. From the foregoing it will be understood that the presence of an amount of ammonia substantially equivalent to the metal compounds to be precipitated is essential only in the second washer $b$, from which the spent liquor is withdrawn. In the first washer $a$ the ammonia is required only in the amount necessary for compensating the acidifying effect of the absorbed hydrogen sulphide and, as a rule, is abundantly absorbed from the gas mixture. The excess of free ammonia absorbed in this washer is not lost, but utilized in the second washer, to which any ammonia still wanted is supplied in regulated amounts from the ammonia tank $f$, which is described below. The third washer, which is provided for removing residual hydrogen sulphide from the gas mixture, may also contain more ammonia than the equivalent to the hydrogen sulphide to be absorbed, since any excess of ammonia is passed, together with the washing liquor of this washer, to the first washer of the series.

Obviously the regenerated liquor may also be conducted from the vessel $d$ into the washer $a$, as shown by the arrows 8 in Fig. 2 and thereafter into the washer $c$, as shown by the arrows 9, from which it is conducted into the washer $b$ (arrows 10).

Alternatively the spent liquor, after having been regenerated with sulphur dioxide in the vessel $d$ can first be introduced into the washer $c$, as shown by the arrow 11 in Fig. 3, and from there into the washer $a$ (arrow 12), to be then returned into the washer $c$ (arrows 13), from which it is conducted into the washer $b$ (arrows 14), where it is exhaustingly treated with ammonia supplied from the tank $f$.

Consequently the invention, if applied to the preferred semi-direct method, will act as follows: The fresh gas mixture, after having been freed by cooling from part of its ammonia, which is dissolved in the condensate, is first freed in the washer $a$ from the rest of ammonia and part of the hydrogen sulphide contained therein. The gas, which still contains hydrogen sulphide, is then caused to act on the partly spent washing liquor in the washer $b$, which is supplied with ammonia liquor from the tank $f$.

Instead of supplying ammonia liquor obtained by condensation from the gas, I may also use the ammonia vapors directly. This involves the further advantage that the quantity of ammonia added can be regulated very accurately.

The interaction of ammonia and hydrogen sulphide causes the metals contained in the washing liquor in the washer $b$ to be converted into sulphides. By regulating the amount of ammonia supplied, I am enabled to obtain a solution of ammonium thiosulphate, which is practically free from dissolved ammonia and contains metal sulphide but no dissolved metal, so that, if this solution is removed, no ammonia is withdrawn from the process. The washer $c$ is here relied upon to completely remove the residual hydrogen sulphide from the gas. To this end ammonia must be supplied to this washer also. Obviously the third washer is required for the reason that the washing liquor in the washer $b$, being partly spent, will gradually absorb less and less hydrogen sulphide.

I may of course apply this method of conducting the washing liquor also in such cases, in which it contains not only dissolved thionates, but also other compounds, which may enter into reaction with the gases. In any of the arrangements described part of the washing liquor of the first washer is led to the second washer either directly or with insertion of the third washer. It will be noted that this arrangement, which is well distinguished from an ordinary countercurrent movement of the liquor and the gas flow allows utilizing the ammonia contents of the gas mixture just at the point where it is needed, through the withdrawl of free ammonia together with the spent liquor is substantially avoided.

I am aware that it has already been proposed to absorb hydrogen sulphide and ammonia from gas mixtures containing same by means of a solution containing thionates of metals which are susceptible to form sulphides insoluble in water, but which are soluble as thionates in the presence of sulphur dioxide. However as this method is operative only if a rather high excess of ammonia is present in the gas mixture, while a considerable amount of residual hydrogen sulphide escaping absorption would be convenient, I make no claim to such method in general, but only to a method which, though based on the same chemical reactions, comprises the step of acting with a gas mixture containing hydrogen sulphide and ammonia on a washing liquor containing a thionate of a metal of the kind described and regulating the ammonia contents of said liquor to an amount substantially equivalent to the metal thionates contained therein, so that the spent liquor when withdrawn contains substantially no free ammonia.

I am also aware that in certain methods of absorbing hydrogen sulphide by means of a liquor containing ammonia and ferric hydroxide in suspension, the steps of removing ammonia from the purified gas and of re-introducing such ammonia into the washing liquid have been suggested before. However as the reaction between ferric hydroxide and hydrogen sulphide does not consume any free ammonia at all and the re-introduction of ammonia serves only the purpose of avoiding ammonia losses in a simple way without using an additional ammonia dissolving device, I make no claim to such re-introduction of ammonia in general, but only to the method of removing hydrogen sulphide from gas mixtures by means of a solution containing metal thionates of the kind described, whereby the reintroduction of ammonia, if it is used at all, is regulated to avoid a substantial content of free ammonia in the spent liquor, since such excess of ammonia would cause an undue consumption of ammonia and an undue additional consumption of sulphur compounds later-on converting such ammonia into ammonium sulphate.

Various changes may be made in the details disclosed in the foregoing specification without departing from the invention or sacrificing the advantages thereof.

In the claims affixed to this specification no selection of any particular modification of the invention is intended to the exclusion of other modifications thereof and the right to subsequently make claim to any modification not covered by these claims is expressly reserved.

I claim:—

1. The method of recovering sulphur and ammonium compounds from gas mixtures containing hydrogen sulphide and ammonia comprising treating said gas in not less than three consecutive steps with a washing liquor containing a thionate of a metal susceptible of forming sulphides insoluble in water, but soluble in the presence of sulphur dioxide, providing in a medium washing step only for that quantity of ammonia which is required in the conversion of the dissolved metal compounds into sulphides and withdrawing the spent washing liquor from said medium step.

2. The method of recovering sulphur and ammonium compounds from gas mixtures containing hydrogen sulphide and ammonia comprising treating said gas in not less than three consecutive steps with a washing liquor containing a thionate of a metal susceptible of forming sulphides insoluble in water but soluble in the presence of sulphur dioxide, providing in a medium washing step only for that quantity of ammonia which is required in the conversion of the dissolved metal compounds into sulphides, withdrawing the spent washing liquor from said medium step, providing in the final washing step a quantity of ammonia sufficing for securing a substantially complete absorption of the residual hydrogen sulphide of the gas, and conducting part of the washing liquor used in the final washing step to a prior washing step.

3. The method of recovering sulphur and ammonium compounds from gas mixtures containing hydrogen sulphide and ammonia comprising treating said gas in not less than three consecutive steps with a washing liquor containing a thionate of a metal susceptible of forming sulphides insoluble in water but soluble in the presence of sulphur dioxide, providing in a medium washing step only for that quantity of ammonia which is required in the conversion of the dissolved metal compounds into sulphides, withdrawing the spent washing liquor from said medium step, providing in the final washing step a quantity of ammonia sufficing for securing a substantially complete absorption of the residual hydrogen sulphide of the gas, and conducting part of the washing liquor used in the final washing step to said medium washing step.

4. The method of recovering sulphur and ammonium compounds from gas mixtures containing hydrogen sulphide and ammonia comprising treating said gas in not less than three consecutive steps with a washing liquor containing a thionate of a metal susceptible of forming sulphides insoluble in water but soluble in the presence of sulphur dioxide, providing in a medium washing step only for that quantity of ammonia which is required in the conversion of the dissolved metal compounds into suphides, withdrawing the spent washing liquor from said medium step, providing in the final washing step a quantity of ammonia sufficing for securing a substantially complete absorption of the residual hydrogen sulphide of the gas, conducting part of the washing liquor used in the final washing step to said medium washing step, and another part thereof to the initial washing step.

5. The method of recovering sulphur and ammonium compounds from gas mixtures containing hydrogen sulphide and ammonia comprising treating said gas in not less than three consecutive steps with a washing liquor containing a thionate of a metal susceptible of forming sulphides insoluble in water but soluble in the presence of sulphur dioxide, providing in a medium washing step only for that quantity of ammonia which is required in the conversion of the dissolved metal compounds into sulphides, withdrawing the spent washing liquor from said medium step, providing in the final washing step a quantity of ammonia sufficing for securing a substantially complete absorption of the residual hydrogen sulphide of the gas, conducting part of the washing liquor used in the final washing step to said medium washing step and another part thereof to the initial washing step, and conducting part of the washing liquor used in the initial washing step to the final washing step.

6. The method of recovering sulphur and ammonium compounds from gas mixtures containing hydrogen sulphide and ammonia comprising treating said gas in not less than three consecutive steps with a washing liquor containing a thionate of a metal susceptible of forming sulphides insoluble in water but soluble in the presence of sulphur dioxide, providing in a medium washing step only for that quantity of ammonia which is required in the conversion of the dissolved metal compound into sulphides, withdrawing the spent washing liquor from said medium step, providing in the final washing step a quantity of ammonia sufficing for securing a substantially complete absorption of the residual hydrogen sulphide of the gas, conducting part of the washing liquor used in the final washing step to said medium washing step and conducting part of the washing liquor used in the initial washing step to the final washing step.

7. The method of recovering sulphur and ammonium compounds from gas mixtures containing hydrogen sulphide and ammonia comprising treating said gas in not less than three consecutive steps with a washing liquor containing a thionate of a metal susceptible of forming sulphides insoluble in water but soluble in the presence of sulphur dioxide, providing in a medium washing step only for that quantity of ammonia which is required in the conversion of the dissolved metal compounds into sulphides, withdrawing the spent washing liquor from said medium step, providing in the final washing step a quantity of ammonia sufficing for securing a substantially complete absorption of the residual hydrogen sulphide of the gas, and conducting part of the washing liquor used in the initial washing step to the medium washing step.

8. The method of recovering sulphur and ammonium compounds from gas mixtures containing hydrogen sulphide and ammonia comprising treating said gas in not less than three consecutive steps with a washing liquor containing a thionate of a metal susceptible of forming sulphides insoluble in water but soluble in the presence of sulphur dioxide, providing in a medium washing step only for that quantity of ammonia which is required in the conversion of the dissolved metal compounds into sulphides, withdrawing the spent washing liquor from said medium step, providing in the final washing step a quantity of ammonia sufficing for securing a substantially complete absorption of the residual hydrogen sulphide of the gas, conducting part of the washing liquor used in the initial washing step to the medium washing step and part of the washing liquor used in the final washing step to the initial washing step.

9. The method of recovering sulphur and ammonium compounds from gas mixtures containing hydrogen sulphide and ammonia comprising reducing the temperature of the gas mixture to separate part of the ammonia, treating said gas in not less than three consecutive steps with a washing liquor containing a thionate of a metal susceptible of forming sulphides insoluble in water but soluble in the presence of sulphur dioxide, adding part of the ammonia previously separated to the washing liquor of a medium washing step to provide for only that quantity of ammonia which is required in the conversion of the dissolved metal compounds into sulphides and withdrawing the spent washing liquor from said medium step.

10. The method of recovering sulphur and ammonium compounds from gas mixtures containing hydrogen sulphide and ammonia comprising reducing the temperature of the gas mixture to separate part of the ammonia, treating said gas in not less than three consecutive steps with a washing liquor containing a thionate of a metal susceptible of forming sulphides insoluble in water but soluble in the presence of sulphur dioxide, adding part of the ammonia previously separated to the washing liquor of a medium washing step to provide for only that quantity of ammonia which is required in the conversion of the dissolved metal compounds into sulphides, withdrawing the spent washing liquor from said medium step, adding another quantity of the ammonia previously separated to the washing liquor of the final washing step to provide for a quantity of ammonia sufficing for securing a substantially complete absorption of the residual hydrogen of the gas, and conducting part of the washing liquor used in the final washing step to a prior washing step.

11. The method of recovering sulphur and ammonium compounds from gas mixtures containing hydrogen sulphide and ammonia comprising treating said gas in not less than three consecutive steps with a washing liquor containing a thionate of a metal susceptible of forming sulphides insoluble in water but soluble in the presence of sulphur dioxide, providing in a medium washing step only for that quantity of ammonia which is required in the conversion of the dissolved metal compounds into sulphides, withdrawing part of the spent washing liquor from said medium washing step, regenerating it by treating it with sulphur dioxide, and returning it to a washing step other than the medium washing step.

12. The method of recovering sulphur and ammonium compounds from gas mixtures containing hydrogen sulphide and ammonia comprising treating said gas in not less than three consecutive steps with a washing liquor containing a thionate of a metal susceptible of forming sulphides insoluble in water but soluble in the presence of sulphur dioxide providing in a medium washing step only for that quantity of ammonia which is required in the conversion of the dissolved metal compounds into sulphides, withdrawing part of the spent washing liquor from said medium washing step, regenerating it by treating it with sulphur dioxide, returning it to a washing step other than the medium washing step, withdrawing another part of the spent washing liquor from said medium washing step, separating it from the metal sulphide contained therein and heating it to obtain a solution of ammonium sulphate.

In testimony whereof I affix my signature.

CHRISTIAN JOHANNES HANSEN.